United States Patent Office 3,123,596
Patented Mar. 3, 1964

3,123,596
AZO-PYRAZOLONE DYES
Robert W. Eltonhead, Reading, Pa., assignor to Crompton & Knowles Corporation, Worcester, Mass., a corporation of Massachusetts
No Drawing. Filed Feb. 5, 1963, Ser. No. 256,266
7 Claims. (Cl. 260—162)

This invention relates to a new group of organic compounds which are useful as dyes. The new compounds form the following structure:

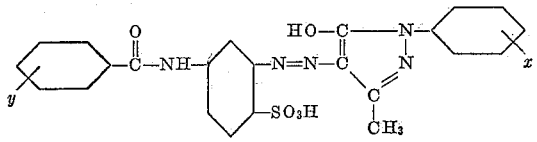

wherein y represents H— or —$NO_2$, x represents —H or —Cl.

It will also be understood that the compounds of this invention not only include the free acid but also the water soluble salts thereof.

The new compounds are obtained by diazotizing certain benzamido-benzene sulfonic acids and coupling the diazo to a phenyl methyl pyrazolone under alkaline conditions and thereafter recovering the dyestuffs.

The compounds prepared in accordance with the invention have unique and highly valuable properties when used as dyes. They will dye polyurethane fibers and natural and synthetic polyamide fibers such as nylons, silk and wool in pure lightfast yellow shades having a very high degree of washfastness even without after-treatments with fixatives. The dyeing can be effected from neutral solution and with a very high degree of dye exhaustion. Because of their neutral dyeing capability, the compounds of this invention can be used in mixed baths with direct dyes. Mixed fabrics, formed from cellulosic fiber and polyamide or polyurethane can be dyed in a single bath. In addition, the yellow dyes produced in accordance with this invention are characterized in that they exhibit more of the greener shades of yellow, whereas most of the yellow dyes for polyamide fiber now on the market tend more to the reddish.

Suitable benzamido-benzene sulfonic acids for use in accordance with this invention include: 2 amino-4-p-nitro benzamido benzene sulfonic acid; 2 amino-4-benzamido benzene sulfonic acid; and 2 amino-4-m-nitro benzamido benzene sulfonic acid. The corresponding ortho nitro derivative could also be employed but it is not commercially available. The intermediate compounds or bases as aforesaid can be prepared as follows:

1 to 1.2 moles of the acid chloride (or the acid chloride dissolved in a non-reactive solvent such as 1,1,1 trichlorethane) is added over a period of 1–3 hours to a vigorously agitated solution of 1 mole of 1,3-diamino-benzene-4-sulfonic acid which has been neutralized with sodium hydroxide to a pH of 7–8 and to which has been added 1.8 moles of sodium acetate. After 15 hours' stirring the crude mono benzoyl derivative is filtered off. It may be purified by recrystallization.

The bases prepared as described above can be diazotized and thereafter coupled under alkaline conditions with pyrazolones such as 1-phenyl-3-methyl-5-pyrazolone and 1-(2' chlorphenyl)-3-methyl-5-pyrazolone, to give the dyes of the invention.

The following examples will serve to illustrate how the compounds of this invention can be prepared and used. In these examples, unless otherwise indicated, parts are by weight; temperatures are given by degrees centigrade and percentages are percentages by weight.

Example I

.83 gm. of sodium nitrite dissolved in 3 mls. water were added to 4.4 gms. of 2 amino-4-p-nitro benzamido benzene sulfonic acid dissolved in 100 mls. of water and 3 mls. of 20% sodium hydroxide solution. This solution was added to ice and water containing 8 mls. of 36% hydrochloric acid. After stirring 1 hour at 3° C., sulfamic acid was added to eliminate the excess nitrous acid. The resulting slurry of the diazo was added slowly to a solution of 1.8 gms. of 1-phenyl-3-methyl-5-pyrazolone, dissolved in 70 mls. water plus 3 mls. of 20% sodium hydroxide solution. During coupling the pH was maintained at 10 by the addition of 20% sodium hydroxide solution. After stirring 1 hour 35 gms. of salt were added to the 700 ml. volume. An hour later the dyestuff was filtered off and dried. Obtained 5.3 gms. of product containing the sodium salt of—

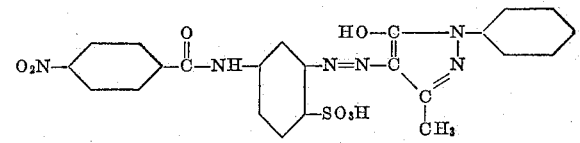

Example II 37.6 gms. of the potassium salt of 2 amino-4-p-nitro benzamido benzene sulfonic acid were pasted with 45 mls. of 36% hydrochloric acid and 100 mls. water. After cooling to 3° C. by the addition of ice, 7.73 gms. of sodium nitrite dissolved in 28 mls. of water were added. After stirring for 2½ hours at 0–3° C. sulfamic acid was added to eliminate the excess nitrous acid. The resulting diazo was added over 10 minutes to a filtered solution of 1-(2' chlorophenyl)-3-methyl-5-pyrazolone dissolved in 36 mls. of 20% sodium hydroxide solution and 600 mls. water. During this time the pH was held at 9.0 by the addition of 20% sodium hydroxide solution. After stirring overnight, the dystuff was filtered off and dried. Obtained 52.8 gms. of product containing the sodium salt of—

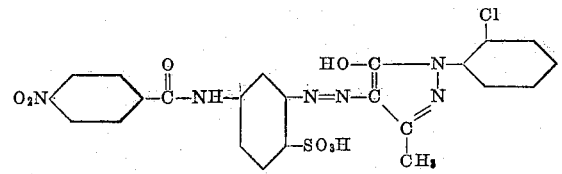

Example III 49.5 gms. of 2 amino-4-benzamido benzene sulfonic acid were ground and pasted with 67 mls. 36% hydrochloric acid and 150 mls. water. Ice was added to reduce the temperature to 3° C. 10.5 gms. of sodium nitrite dissolved in 38 mls. of water were then added. After stirring 3 hours at 0–3° C., sulfamic acid was added to eliminate the excess nitrous acid. The volume of diazo obtained was 930 mls. To a filtered solution of 14.4 gms. of 1-phenyl-3-methyl-5-pyrazolone dissolved in 310 mls. water and 16.5 mls. of 20% sodium hydroxide solution, 465 mls. of the diazo slurry were added while stirring. During the 10 minute addition of diazo the pH was maintained at 9.5–10 by the addition of 20% sodium hydroxide solution. After stirring overnight the pH was 8.7. The dyestuff was filtered off and dried. Obtained 35.2 gms. of product containing the sodium salt of—

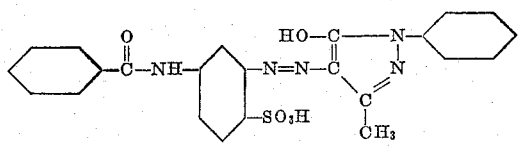

Example IV 17.2 gms. of 1-(2' chlorophenyl)-3-methyl-5-pyrazolone were dissolved in 370 mls. water and 27 mls. of 20% sodium hydroxide solution. The solution was filtered. With stirring, 465 mls. of the diazo slurry prepared as in Example III, were added over 10 minutes, the pH being maintained at 9.5–10 by the addition of 20% sodium hydroxide solution. After stirring overnight the pH was 8.7. The dyestuff was filtered off and dried. Obtained 36.6 gms. of product containing the sodium salt of—

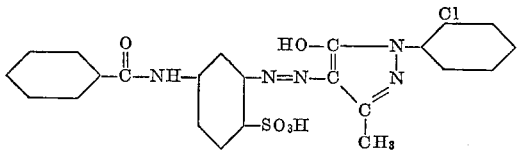

Example V 27 gms. of 2 amino-4-m-nitro benzamido benzene sulfonic acid were ground and pasted with 700 mls. water and 40 mls. 36% hydrochloric acid. 6.4 gms. sodium nitrite dissolved in 23 mls. water were added. After stirring 2½ hours at 0–3° C. sulfamic acid was added to eliminate the excess nitrous acid. The volume of diazo obtained was 800 mls. 3.5 gms. of 1-phenyl-3-methyl-5-pyrazolone were dissolved in 300 mls. of water containing 5 mls. of 20% sodium hydroxide solution. 200 mls. of the diazo were added over 10 minutes, the pH being maintained at 10 by the addition of 20% sodium hydroxide solution. After stirring 2 hours at 20° C. 25 gms. of salt were added to the 500 mls. of coupling. Hydrochloric acid 36% was added to adjust the pH to 8.8. After stirring overnight the dyestuff was filtered off and dried. Obtained 6.5 gms. of product containing the sodium salt of—

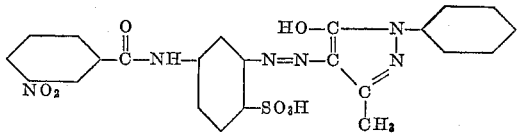

Example VI

In the above manner, 200 mls. of the diazo prepared as in Example V, were coupled to 4.2 gms. of 1-(2' chlorophenyl)-3-methyl-5-pyrazolone dissolved in 300 mls. water containing 5 mls. of sodium hydroxide. Obtained 10.4 gms. of product containing the sodium salt of—

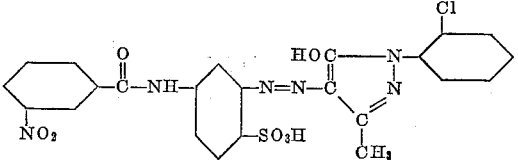

I claim:
1. A compound having the following structure:

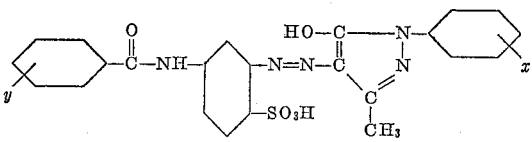

wherein $y$ represents a substituent selected from the group consisting of —H and —$NO_2$ and where $x$ represents a substituent selected from the group consisting of —H and —Cl.

2. The water soluble salts of a compound according to claim 1.

3. The compound:

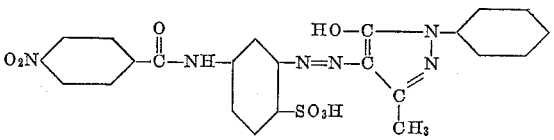

4. The compound:

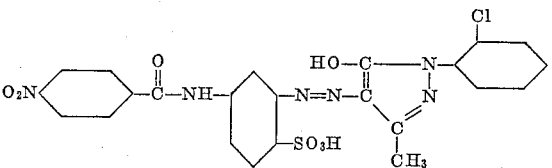

5. The compound:

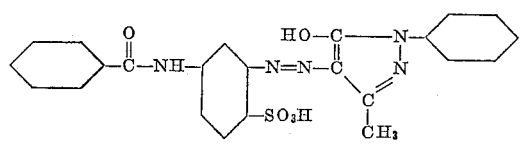

6. The compound:

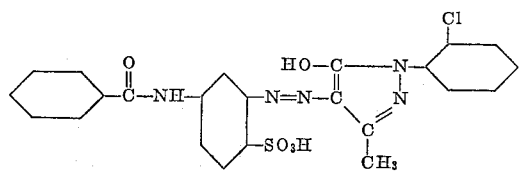

7. The compound:

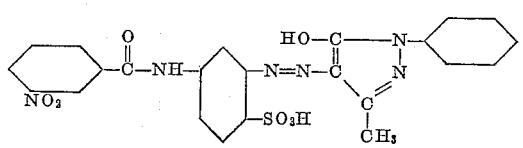

References Cited in the file of this patent
FOREIGN PATENTS
313,636   Great Britain _____ June 17, 1929